United States Patent

[11] 3,584,690

| [72] | Inventor | Jerry A. Taylor<br>P.O. Box 669, Dixon, Calif. 95620 |
|---|---|---|
| [21] | Appl. No. | 747,653 |
| [22] | Filed | July 25, 1968 |
| [45] | Patented | June 15, 1971 |

[54] SEPARATOR FOR TOMATO HARVESTER
6 Claims, 15 Drawing Figs.

[52] U.S. Cl. .................................................... 171/27
[51] Int. Cl. ................................................ A01d 17/08
[50] Field of Search .......................................... 171/27, 14, 15, 130, 132

[56] References Cited
UNITED STATES PATENTS
3,199,604  8/1965  Lorenzen et al. ............. 171/27
3,390,768  7/1968  Button .......................... 171/27

*Primary Examiner*—Antonio F. Guida
*Attorney*—Lothrop & West

ABSTRACT: A tomato harvester carriage has an open return, separating conveyor operating over a trash receiver and two groups of interspersed walker plates disposed over the conveyor, the walker plates at their forward end being mounted for substantial reciprocation and each group being separately rotated at the rearward end, the phase of rotation of one group being adjustable with respect to the phase of rotation of the other group. The walker plates have substantially horizontal and also inclined upper edges that are serrated. A loading conveyor carries tomato plants to the walker plates, which shake the tomatoes off of the vines onto the separating conveyor.

PATENTED JUN 15 1971

INVENTOR.
JERRY A. TAYLOR

BY

Lothrop & West
ATTORNEYS

INVENTOR
JERRY A. TAYLOR
BY
Lothrop & West
ATTORNEYS

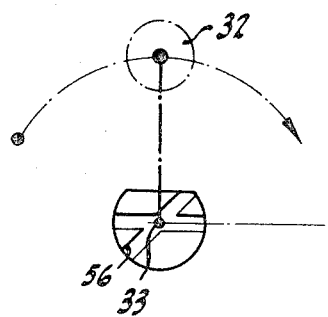
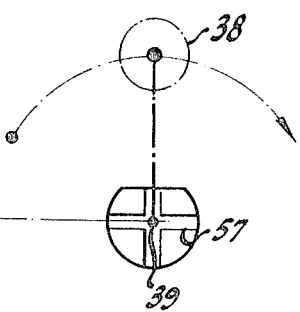
FIG-11
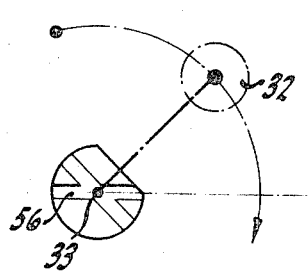
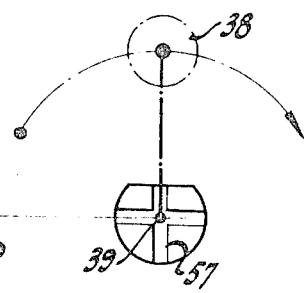
FIG-12
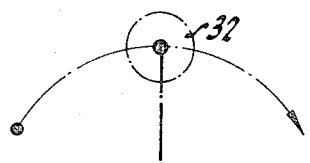
FIG-13
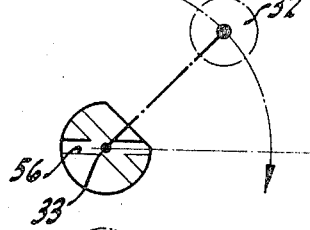
FIG-14
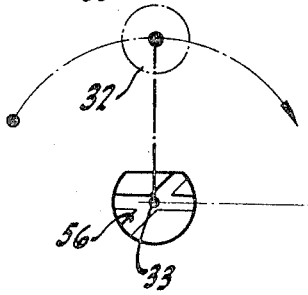
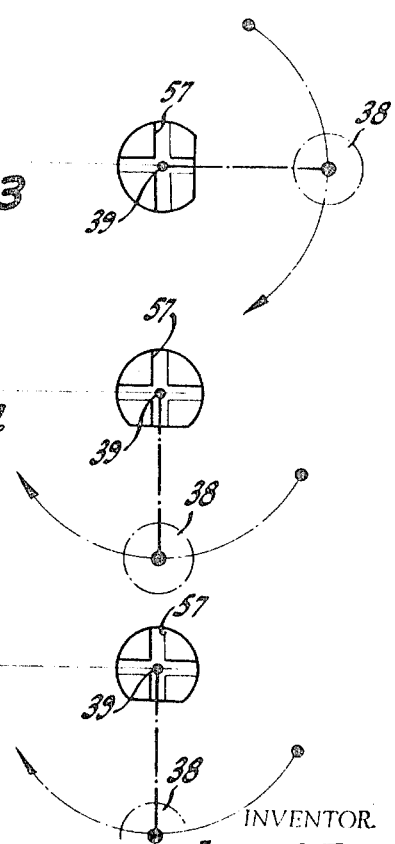
FIG-15
INVENTOR.
JERRY A. TAYLOR
BY
Lothrop & West
ATTORNEYS

SEPARATOR FOR TOMATO HARVESTER

Considerable work has been done in recent years toward the provision of mechanisms for harvesting tomatoes mechanically rather than by hand. As experience in the use of various different mechanisms has been gained, it has been possible to appreciate some of the shortcomings in the earlier machines and to find fields of improvement for subsequent devices.

It is therefore an object of my invention to provide a separator for tomato harvester with improved characteristics.

Another object of the invention is to provide a separator for tomato harvester that will more effectively gather usable tomatoes from the vines.

Another object of the invention is to provide a separator for tomato harvester having an especially effective walker plate assembly.

A further object of the invention is to provide a separator for tomato harvester with walker plates arranged so that the phase of operation of the plates can be varied at will to match individual harvesting conditions.

A further object of the invention is to provide a separator for tomato harvester in which the walker plates have a special configuration for improved results.

Another object of the invention is to provide a separator for tomato harvester in which the tomato receiving and separating conveyor is advantageously disposed.

Other objects of the invention together with the foregoing are attained in the embodiment of the invention described in the accompanying description and illustrated in the accompanying drawings, in which:

FIG. 7 is a fragmentary detail in plan showing a portion of the separator conveyor with another portion broken away;

FIG. 8 is a detail showing in cross section the structure in FIG. 7, the planes of section being indicated by the lines 8—8;

FIG. 9 is a cross section of the structure shown in FIG. 7, the plane of section being indicated by the line 9—9 of FIG. 7;

FIG. 10 is a cross section of the structure of FIG. 7, the plane of section being indicated by the line 10—10; and FIGS. 11—15 inclusive are diagrams showing different phase relationships of the drive means for the two groups of walker plates.

Figure 1:
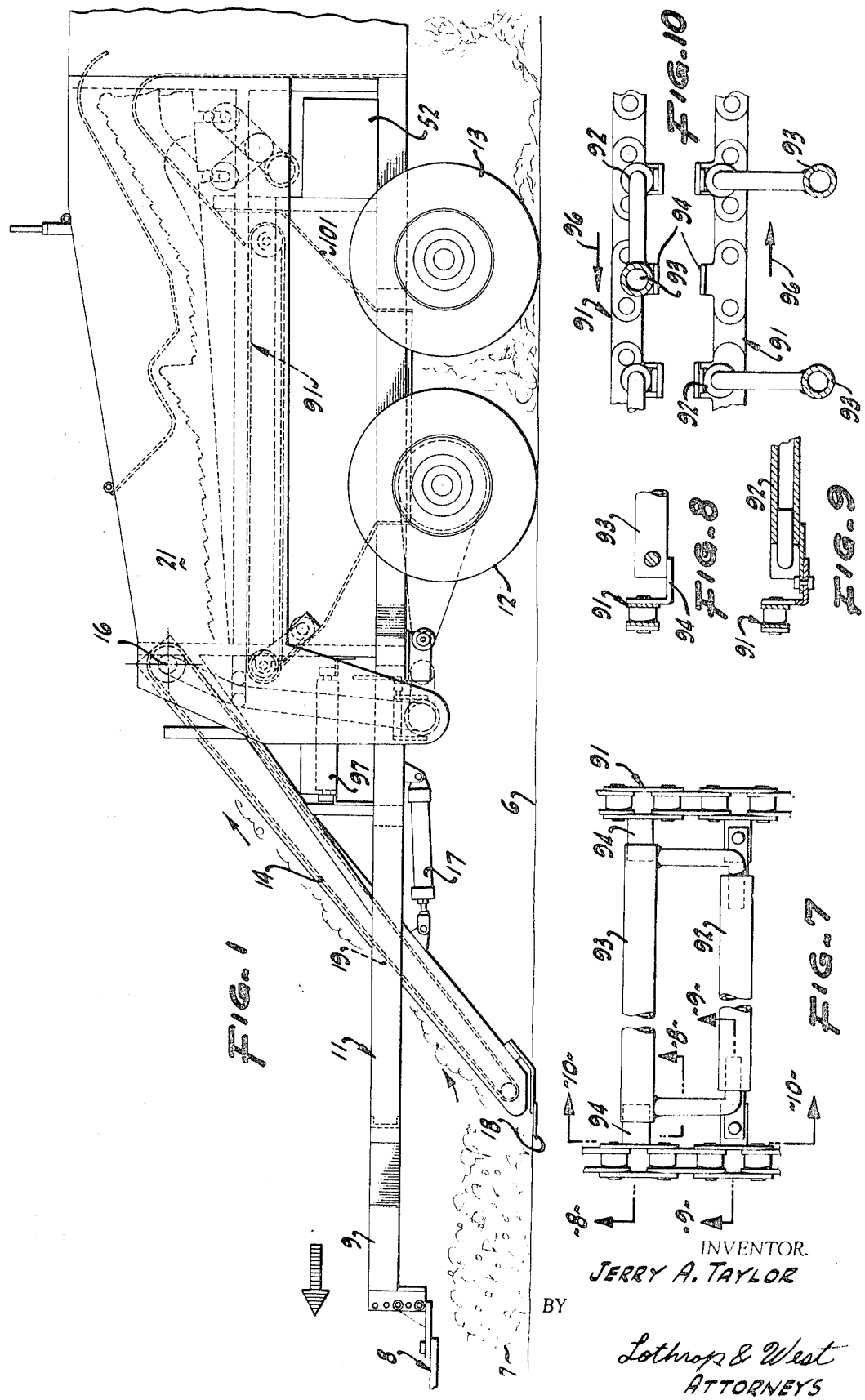
FIG. 1 is a side elevation of a separator for tomato harvester constructed pursuant to the invention.
Figure 2:
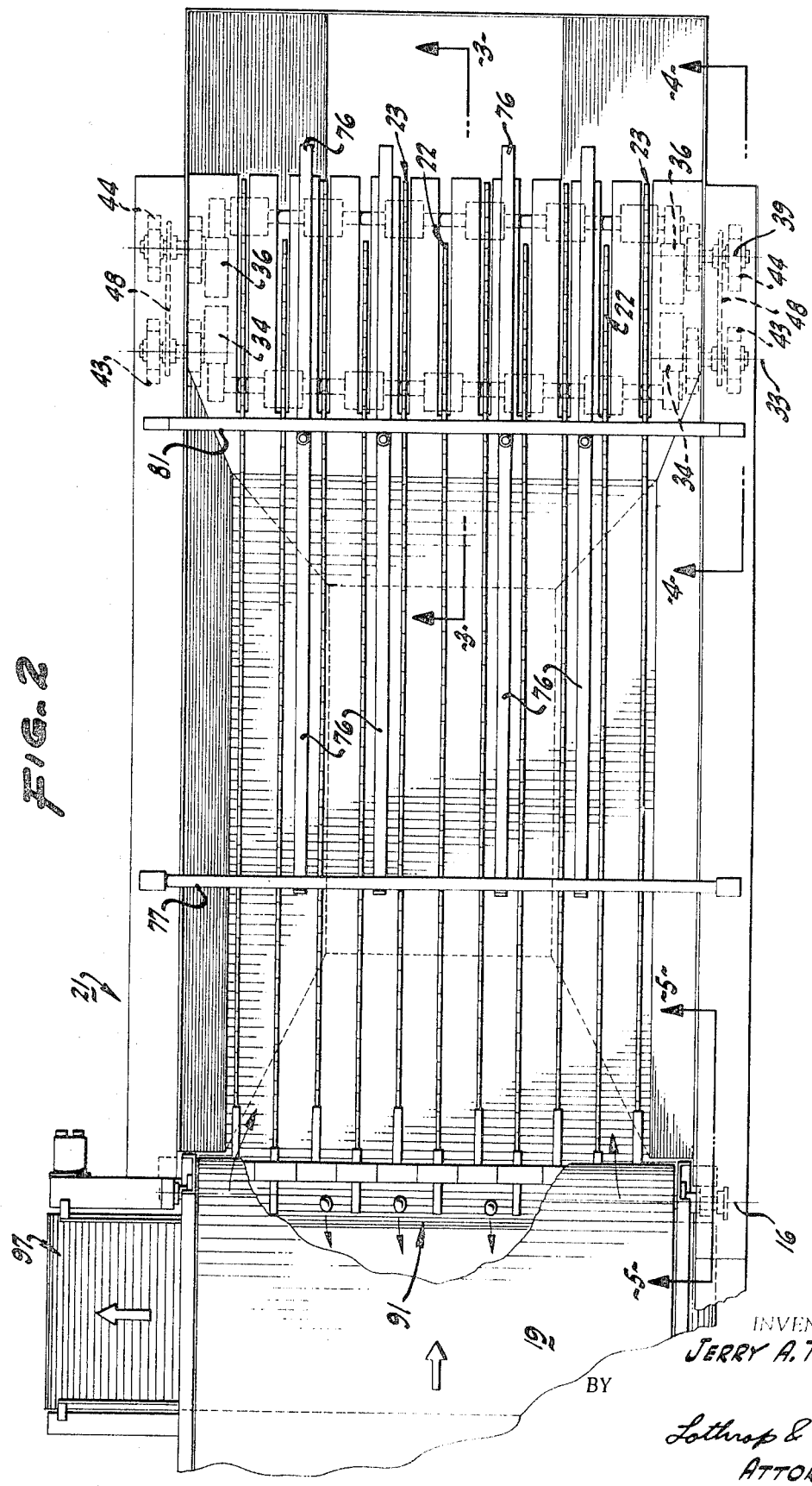
FIG. 2 is a plan of the device of FIG. 1, certain portions being broken away to disclose the interior construction.

Pursuant to the invention the separator for tomato harvester is for use in a field 6 in which growing tomato vines 7 are found, usually in rows. The device is supported and advanced by a tractor 8 or other draft implement by means of a hitch 9 at the forward end of a carriage 11. Ground-engaging wheels 12 and 13 also support the carriage 11.

On the forward portion of the carriage is an elevator frame 14 mounted to pivot about a transverse axis 16 under the control of a fluid jack 17 so that the angle of the conveyor 14 can be varied. At its lower end the elevator frame 14 carries a severing knife 18 for cutting the tomato plants free from their roots to make them freely available to a loading conveyor. This preferably comprises a beltlike member 19 with flights, if desired, driven in a direction to engage and lift the severed tomato plants and the tomatoes thereon in an upward and rearward direction. The tomato plants so carried are deposited onto a separator mechanism 21.

The separator mechanism is inclusive of a first group of walker plates 22 and a second group of walker plates 23. The walker plates of each of the groups are laterally spaced apart and are regularly interspersed with the walker plates of the other group. The walker plates of the two groups alternate transversely of the carriage, any number of such plates being provided in one group, depending upon the machine width.

Figure 3:
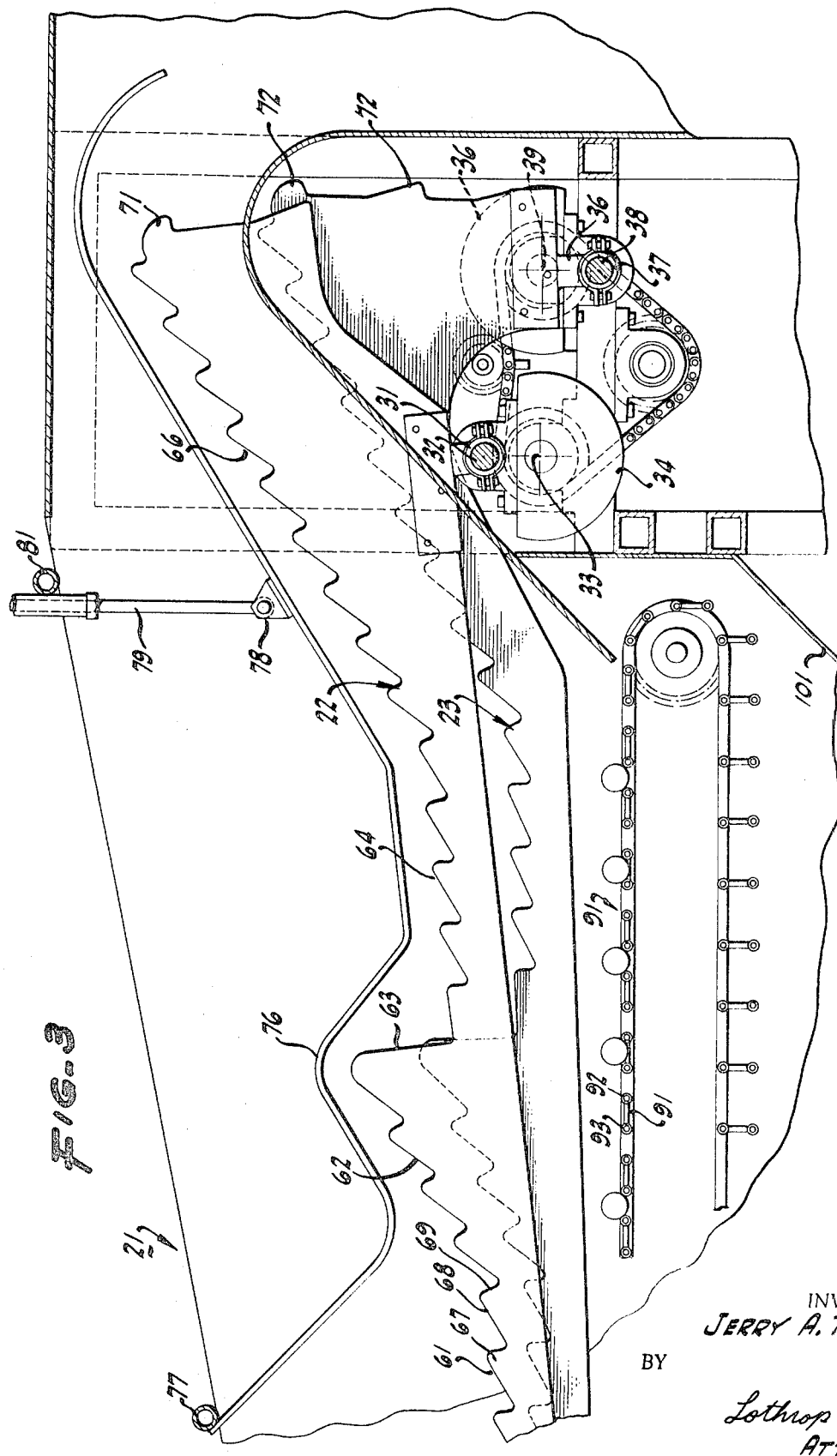
FIG. 3 is a cross section to a different scale with portions being broken away, the plane of section being indicated by the line 3—3 of FIG. 2.
Figure 5:
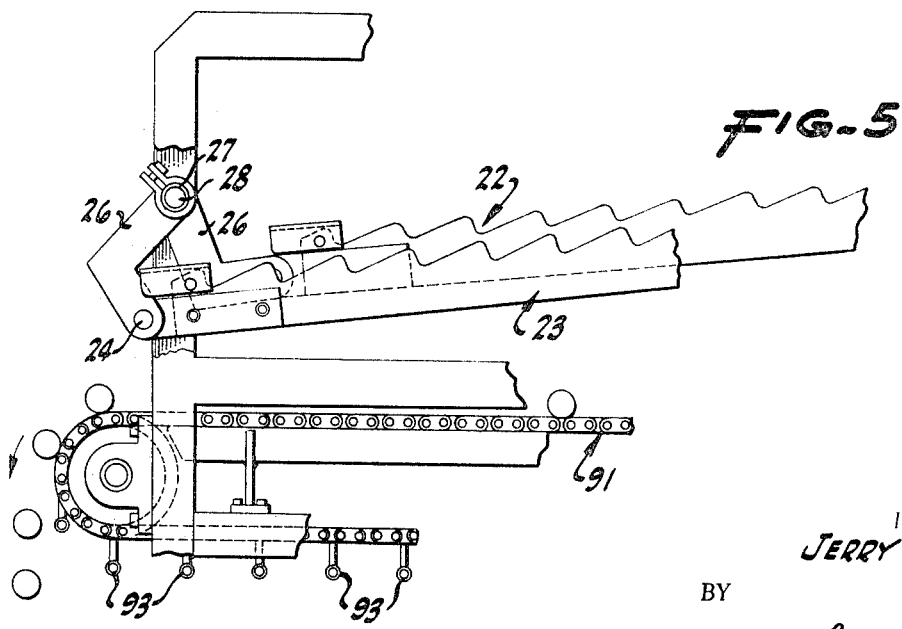
FIG. 5 is a fragmentary detail with portions broken away indicating the front portion of a part of the machine.
Figure 6:
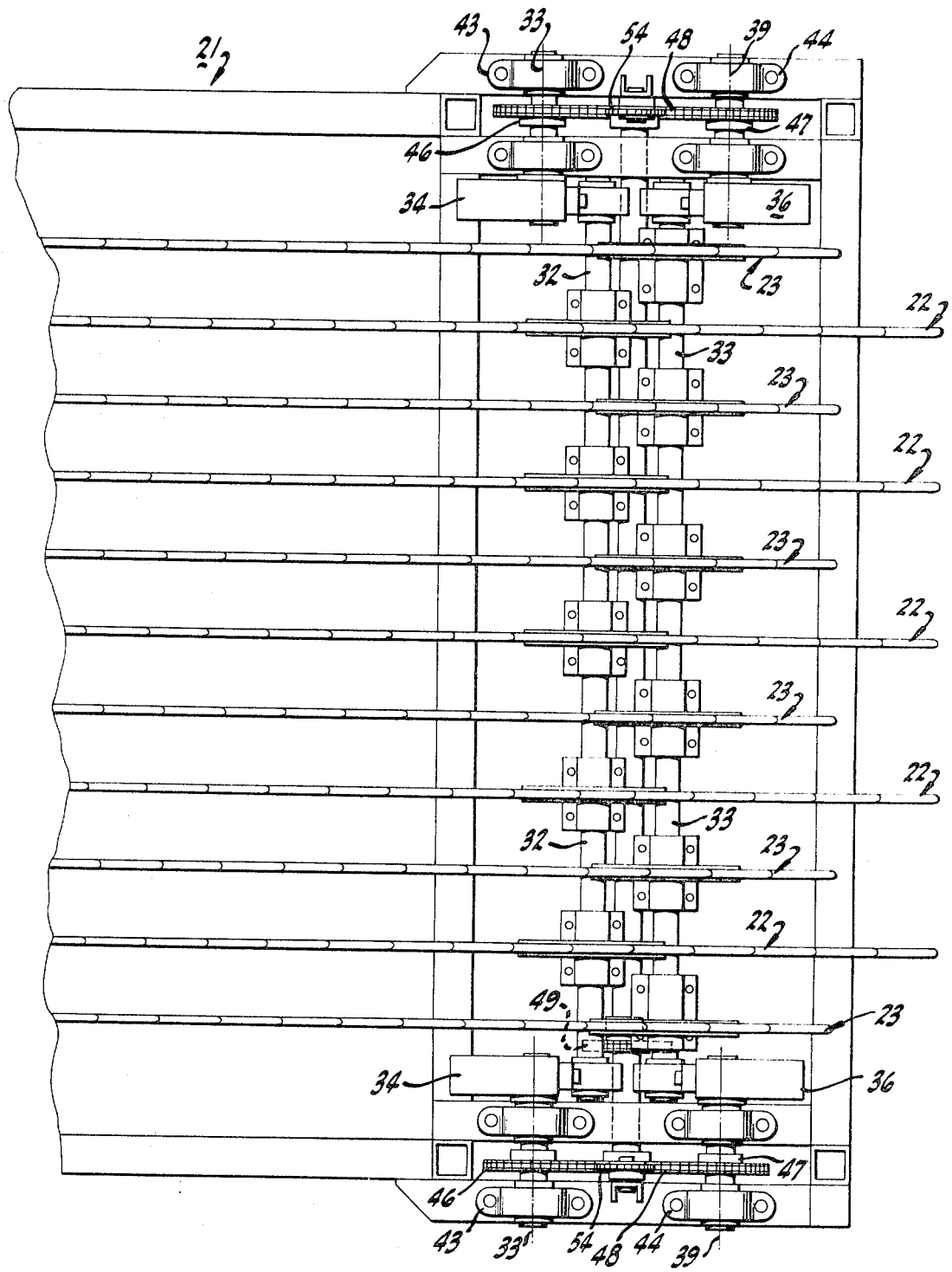
FIG. 6 is a plan similar to FIG. 2 but to an enlarged scale.

At their front ends the various walker plates 22 and 23, as shown particularly in FIG. 5, are connected by pivots 24 to pivot links 26 suspended on bearings 27 on a cross shaft 28, so that the links can swing freely. Although they actually move in arcs, the front end plate movement is substantially in a horizontal direction, the amount of arcuate movement not being critical. At their rear ends one group of walker plates 22 is appropriately mounted on a driving device for rotation. Each of the plates is provided with a bearing 31 engaging the throw of a crankshaft 32 designed to revolve about an axis 33. All of the bearings 31 of all of the walker plates 22 partake of a circular or orbital motion, the throw of the crankshaft 32, as shown in FIG. 3, being at the 12 o'clock position. Preferably some of the weight of the bearings 31, walker plates and shaft throw is offset by counterbalances 34 at the shaft ends.

Figure 4:
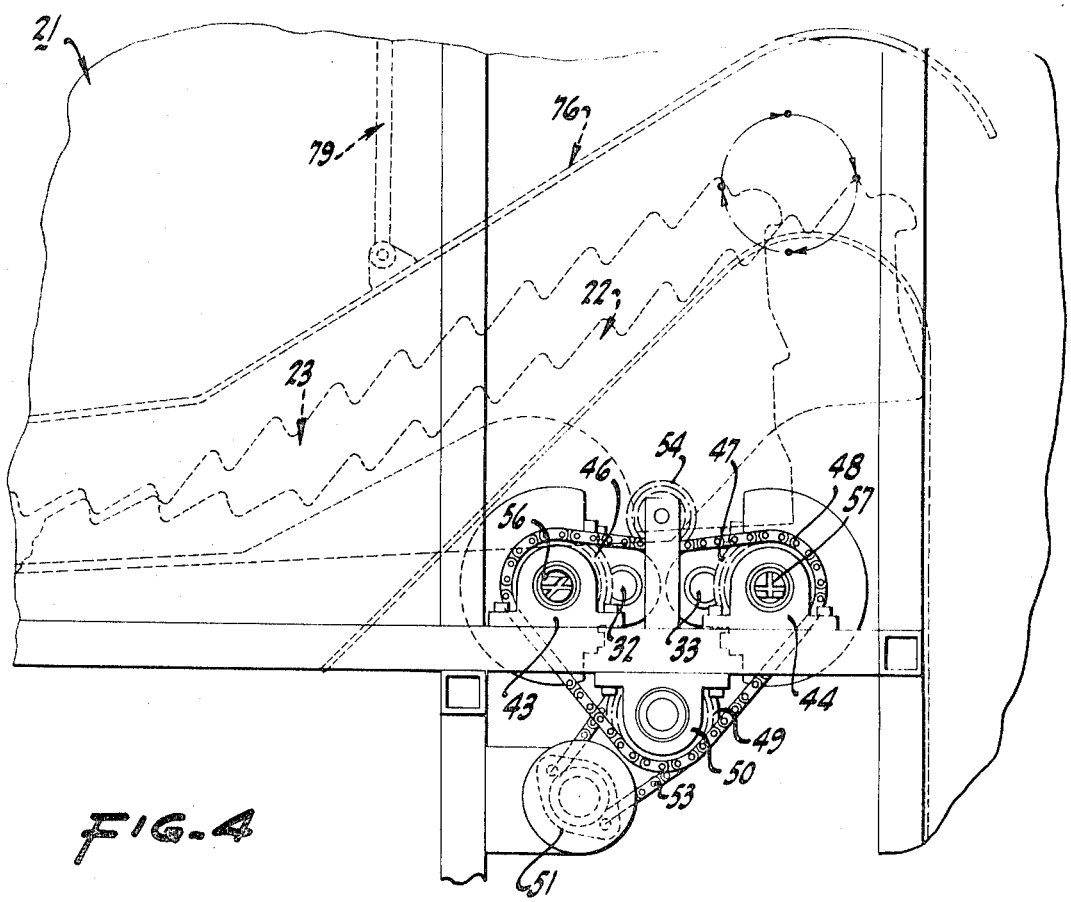
FIG. 4 is a cross section substantially to the scale of FIG. 3 and showing the operating parts in a different relationship.

Somewhat similarly, the interspersed walker plates of the second group 23 are provided with downward extensions 35 carrying bearings 37 journaled on the eccentric throw of a crankshaft 38 designed to rotate about a second, transverse axis 39 parallel to the axis 33. Appropriate counterweights 36 are provided to offset some of the group unbalance. The crankshafts 32 and 38 are carried in appropriate bearings 43 and 44 (FIG. 4) on the frame of the carriage. At one end each of the shafts 32 and 38 carries one of a pair of sprockets 46 and 47. A drive chain 48 is trained around the sprockets 46 and 47 and likewise engages a driving sprocket 49 carried in a bearing 50 on the carriage frame.

A hydraulic drive motor 51 on the carriage is supplied with hydraulic fluid under pressure and appropriate control from a hydraulic power unit 52 (FIG. 1) and is joined by a chain 53 to drive the sprocket 49 and the chain 48. The chain 48 is extra long but for driving is normally tightened by an idler sprocket 54. The ends of the shafts 32 and 38 carry flats, markings or grooves 56 and 57 so that the polar or rotational orientation of the shafts can readily be determined. With this arrangement and when the idler 54 has been backed off and leaves the chain 48 loose, the chain can be detached from one or both of the sprockets. Either or both sprockets can then be manually turned to new positions as indicated by the marks 56 and 57. Then the chain 48 can be reinstalled and the idler 54 tightened for normal driving. In this fashion there is afforded a means for relating the two shafts 32 and 38 in any relative rotated positions about the axes 33 and 39 that may be desired to produce the desired phase relationship of the shafts.

This phase change ability is consequential, as particularly shown in FIGS. 11—15 inclusive, which indicate some of the selectable positions of the two crankshafts and the two groups of walker plates with respect to each other. By effectuating variations in phase relationship, all of the walker plates of both groups can be made to follow their paths in unison (FIG. 11) or they can be polarly or circularly spaced apart in incremental amounts so that they operate with a greater and greater angular difference until they are 180° out of phase or opposite to each other (FIG. 15). This variation in crank setting is helpful in adapting the machine to handle appropriately and efficiently tomato vines and tomato fruit at different stages of maturity, in different bulk amounts and with different amounts of tenacity of the fruit on the vine.

With this arrangement, the rear end of each of the walker plates moves substantially in a circle, the forward end moves approximately in a horizontal line and the intermediate portions move in corresponding paths. There is no substantial vertical movement at the front end of the walker plates, but there is a fixed amount of horizontal movement either in phase or in varying amounts out of phase. At the rear end there is always a fixed amount of both vertical and horizontal movement. When the interspersed walker plates move exactly in phase, all parts of all of the superposed vines are moved alike, being moved uniformly rearwardly due to the plate contour and being lifted and lowered as a unit except that the vertical amplitude increases toward the rear. If the plates are 180° out of phase, then adjacent portions of the vines are joggled a maximum amount. Intermediate amounts of phase difference afford intermediate amounts of joggling and shaking.

The walker plates are conveniently thin, light members covered with a readily cleanable material such as fiber glass and plastic and are particularly contoured. The front end portion 61 of each walker plate is approximately horizontal and merges with a front inclined portion 62. The front inclined portion rises toward the rear and then has an abrupt drop 63 to merge with a rear substantially horizontal or straight portion 64. This leads to a rear inclined portion 66 rising toward the back of the machine in a substantial amount. All of the upper surfaces 61, 62, 64 and 66 are provided with many serrations 67 each having an inclined face 68 rising toward the rear and merging with an abruptly dropping rear face 69. In addition, some or all of the walker plates on their rear 152 portions may have serrated hooks 71 and 72.

In the operation of this structure the path of movement of each of the plates is such that the serrations engage with and assist the vines to move toward the front of the machine. The plates thus act as means for conveying the vines to the rear. The agitation of the vines on the walker plates is such that the tomatoes attached thereto are shaken off and fall by gravity between the walker plates. This operation is enhanced by lifting the vines on the front inclined portion 62, for example, and then letting them drop abruptly onto the rear horizontal portion 64.

The path of the vines is partly defined by the walker plates and is also defined by a number of overlying confining bars 76 at their forward ends connected to a support rod 77 and at their rearward ends connected by an articulation 78 to a vertical adjustment rod 79 mounted on a cross bar 81 on the carriage frame. The bars 76 are parallel to each other and cover the width of the carriage. They permit the tomato vines to follow the motion of the walker plates but do not permit the vines to rise high enough to come out of contact with the various serrations. The variable height of the articulation 78 can be set in accordance with the bulk of the material being handled at any time. The bars 76 turn downwardly at the rear and assist the walker plates in discharging the picked vines over the back end of the machine toward the ground.

During the conveying and shaking operation of the vines, the tomatoes are detached and fall between the walker plates onto a subjacent conveyor 91. This conveyor is of the chain type and includes a number of fixed crossbars 92 and interspersed movable crossbars 93. In the upper run of the conveyor, as particularly shown in FIGS. 7 and 11, although the fixed bars 92 are not affected the movable bars 93 are sustained against gravity on support brackets 94. As the upper run of the conveyor moves in the direction of the arrow 96 in FIG. 10, the support bars 93 lie closely together and define spaces between them which are too small for the desired tomatoes to pass. Extra-small fruit or trash, clods and the like which are small enough fall between the adjacent bars 92 and 93. The larger tomatoes are carried forwardly and are discharged from the upper run of the conveyor onto a cross conveyor 97 which carries them to a point for further use.

As the bars 93 round the forward end of the conveyor, they fall by gravity and on their return movement hang, as shown in FIG. 10, to afford an approximate doubling of the space between them. Should any material tend to lodge or become blocked between the upper and lower conveyor runs, that material is released to fall into a trash receiver 101 on the carriage and is directed onto the ground.

It has been found in practice that a tomato harvester constructed in accordance with the present disclosure can readily be set and adjusted for satisfactory operation in the field of tomatoes being harvested at any particular time. The ability to adjust the confining bars 76 in order to accommodate the particular bulk encountered at the time is important, and the ability to change the phase relationship of the two groups of walker plates to vary the amount of shaking and wracking movement imparted to the vines is important in affording maximum harvesting results by empirical field setting of the harvester.

What I claim is:

1. A separator for a tomato harvester including a carriage adapted to move forwardly, a tomato vine severing and delivering mechanism on said carriage, and a tomato conveyor on said carriage, said separator comprising:
   a. a first group of walker plates longitudinally arranged over said tomato conveyor;
   b. a second group of walker plates interspersed with said first group;
   c. means on said carriage for mounting said groups of walker plates for substantially horizontal reciprocation at the forward end thereof;
   d. means on said carriage for mounting said first group of walker plates for substantial rotation at the rearward end thereof;
   e. a first means for rotating the rearward end of said first group of walker plates, said first means including a first crankshaft rotatably mounted on said carriage and having a plurality of throws pivotally connected to said first group of walker plates;
   f. means on said carriage for mounting said second group of walker plates for substantial rotation at the rearward end thereof;
   g. a second means for rotating the rearward end of said second group of walker plates, said second means including a second crankshaft rotatably mounted on said carriage and having a plurality of throws pivotally connected to said second group of walker plates, said first crankshaft and said second crankshaft carrying markings indicating the relative polar orientation of said crankshafts;
   h. a fluid drive motor;
   i. chain means connected to said drive motor and said crankshafts for driving said crankshafts in unison; and,
   j. adjustable means for driving said first means and said second means in a selected phase relationship with respect to each other, said adjustable means including a tension release member normally engaging said chain means, said tension release member being selectively disengageable from said chain means to rotate said crankshafts to a selected phase relationship with respect to each other as determined by reference to said markings on said crankshafts.

2. A separator for a tomato harvester as in claim 1 wherein at least some of said walker plates have approximately horizontal upper edge portions and inclined upper edge portions with serrations along said horizontal and said inclined portions.

3. A separator for a tomato harvester as in claim 2 including guide bars arranged longitudinally on said carriage over said walker plates.

4. A separator for a tomato harvester as in claim 3 wherein said guide bars approximately follow the horizontal edge portions and the inclined edge portions of said walker plates.

5. A separator for a tomato harvester as in claim 1 wherein at least some of said walker plates are formed along the upper edge with a front substantially horizontal portion, a front inclined portion rising toward the rear, a rear substantially horizontal portion, and a rear inclined portion rising toward the rear; and wherein serrations rising toward the rear are formed in said front horizontal portion, said front inclined portion, said rear horizontal portion, and said rear inclined portion.

6. A separator for a tomato harvester as in claim 5 wherein the rear end of said front inclined portion terminates in an abruptly dropping portion merging with the front end of said rear horizontal portion.